United States Patent
Zeng et al.

(10) Patent No.: US 8,737,844 B2
(45) Date of Patent: May 27, 2014

(54) METHOD AND APPARATUS FOR IMPLEMENTING PDM-BPSK MODULATION AND QPSK MODULATION IN COMPATIBLE MANNER

(75) Inventors: Li Zeng, Shenzhen (CN); Lei Liu, Chengdu (CN); Chao Lu, Shenzhen (CN); Yanfu Yang, Shenzhen (CN); Linghao Cheng, Shenzhen (CN); Zhaohui Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 183 days.

(21) Appl. No.: 13/545,637

(22) Filed: Jul. 10, 2012

(65) Prior Publication Data

US 2012/0275791 A1 Nov. 1, 2012

Related U.S. Application Data

(63) Continuation of application No. PCT/CN2010/070193, filed on Jan. 14, 2010.

(51) Int. Cl.
*H04B 10/00* (2013.01)

(52) U.S. Cl.
USPC .......................................................... 398/188

(58) Field of Classification Search
None
See application file for complete search history.

(56) References Cited

U.S. PATENT DOCUMENTS

| | | | | |
|---|---|---|---|---|
| 7,398,022 B2 * | 7/2008 | Zitelli | ............................ | 398/183 |
| 7,460,793 B2 | 12/2008 | Taylor | | |
| 8,238,759 B2 * | 8/2012 | Joyner et al. | .................. | 398/183 |
| 2003/0231601 A1 | 12/2003 | Kim | | |
| 2005/0111582 A1 | 5/2005 | Sasaki et al. | | |
| 2007/0009269 A1 * | 1/2007 | Zitelli | ............................ | 398/188 |
| 2007/0297796 A1 | 12/2007 | Calabro et al. | | |
| 2008/0145052 A1 | 6/2008 | Hecker et al. | | |
| 2009/0257755 A1 | 10/2009 | Buelow | | |
| 2010/0080569 A1 | 4/2010 | Xu et al. | | |

FOREIGN PATENT DOCUMENTS

| | | |
|---|---|---|
| CN | 1266851 C | 7/2006 |
| CN | 101232479 | 7/2008 |
| CN | 101267255 | 9/2008 |
| CN | 101350673 | 1/2009 |

(Continued)

OTHER PUBLICATIONS

PCT International Search Report mailed Oct. 28, 2010, issued in related International Application No. PCT/CN2010/070193, Huawei Technologies Co., Ltd. (4 pages).

(Continued)

*Primary Examiner* — Danny Leung

(57) ABSTRACT

A method for implementing Polarization Division Multiplexing Binary Phase Shift Keying (PDM-BPSK) modulation and Quadrature Phase Shift Keying (QPSK) modulation in a compatible manner includes: dividing a direct current (DC) light into a first channel of light and a second channel of light with the same power; separately performing optoelectrical modulation on the first channel of light and the second channel of light and correspondingly outputting a first optical signal and a second optical signal in a Binary Phase Shift Keying (BPSK) format; performing polarization state control on the first optical signal; performing a phase shift on the first optical signal or the second optical signal; and performing optical signal combination with the polarization state preserved on the first optical signal and the second optical signal after the polarization state control and the phase shift, and outputting a PDM-BPSK modulation optical signal or a QPSK modulation optical signal.

16 Claims, 10 Drawing Sheets

(56) References Cited

FOREIGN PATENT DOCUMENTS

| | | | |
|---|---|---|---|
| CN | 101505192 A | 8/2009 | |
| CN | 101577589 A | 11/2009 | |
| JP | 2009-100298 | 5/2009 | |
| KR | 10-2009-0050134 | 5/2009 | |

OTHER PUBLICATIONS

Written Opinion of the International Searching Authority dated Oct. 28, 2010 in connection with International Patent Application No. PCT/CN2010/070193.

Supplementary European Search Report dated Sep. 3, 2012 in connection with European Patent Application No. EP 10 84 2836.

G. Charlet, et al., "Transmission of 81 channels at 40Gbit/s over a Transpacific-Distance Erbium-only Link, using PDM-BPSK Modulation, Coherent Detection, and a new large effective area fibre", ECOC 2008, vol. 7-29, Sep. 21-25, 2008, p. 1-2.

Translation of Office Action dated Nov. 25, 2012 in connection with Chinese Patent Application No. 201080003331.0.

\* cited by examiner

METHOD AND APPARATUS FOR IMPLEMENTING PDM-BPSK MODULATION AND QPSK MODULATION IN COMPATIBLE MANNER

FIELD OF THE INVENTION

This application is a continuation of International Application No. PCT/CN2010/070193, filed on Jan. 14, 2010, which is hereby incorporated by reference in its entirety.

FIELD OF THE INVENTION

The present invention relates to the optical modulation technology field, and in particular, to a method and an apparatus for implementing PDM-BPSK modulation and QPSK modulation in a compatible manner.

BACKGROUND OF THE INVENTION

In recent years, with a sharp increase of transmission service capacity, single-wavelength capacity of an optical backbone DWDM (Dense wavelength division multiplexing, dense wavelength division multiplexing system) network is upgraded from 10 Gb/s to 40 Gb/s. At the same time, a 100 Gb/s single-wavelength rate becomes carriers' next point of interest. Key technologies for achieving this technical upgrade are various advanced modulation technologies, for example, a PDM-BPSK (Polarization Division Multiplexing Binary Phase Shift Keying, polarization division multiplexing binary phase shift keying) modulation technology and a QPSK (Quadrature Phase Shift Keying, quadrature phase shift keying) modulation technology. Different apparatuses may need to be designed for different modulation manners to implement the PDM-BPSK modulation and the QPSK modulation.

A same type of apparatus is capable of implementing only one modulation manner. Therefore, to implement the PDM-BPSK modulation and the QPSK modulation, two different types of apparatus need to be designed, which increases a design cost.

SUMMARY OF THE INVENTION

Embodiments of the present invention provide a method and an apparatus for implementing PDM-BPSK modulation and QPSK modulation in a compatible manner, where the two types of modulation manner PDM-BPSK and QPSK are able to be implemented in the compatible manner, which saves a design cost.

Technical solutions employed in the embodiments of the present invention are:

A method for implementing PDM-BPSK modulation and QPSK modulation in a compatible manner, including:

dividing a DC light into a first channel of light and a second channel of light with the same power;

separately performing optoelectrical modulation on the first channel of light and the second channel of light and correspondingly outputting a first optical signal and a second optical signal in a BPSK format;

performing polarization state control on the first optical signal, where a polarization state of the first optical signal on which the polarization state control is performed is perpendicular to or consistent with a polarization state of the second optical signal;

performing a phase shift on the first optical signal or the second optical signal, where a phase difference between the first optical signal and the second optical signal on which the phase shift is performed is $\pi/2$ or remains unchanged; and performing optical signal combination with the polarization state preserved on the first optical signal and the second optical signal after the polarization state control and the phase shift; and outputting a PDM-BPSK modulation optical signal or a QPSK modulation optical signal.

An apparatus for implementing PDM-BPSK modulation and QPSK modulation in a compatible manner, including:

a splitting module, configured to divide a DC light into a first channel of light and a second channel of light with the same power;

a first modulation module, configured to perform optoelectrical modulation on the first channel of light and output a first optical signal in a BPSK format;

a second modulation module, configured to perform optoelectrical modulation on the second channel of light and output a second optical signal in the BPSK format;

a polarization state control module, configured to perform polarization state control on the first optical signal, where a polarization state of the first optical signal on which the polarization state control is performed is perpendicular to or consistent with a polarization state of the second optical signal;

a phase shift module, configured to perform a phase shift on the first optical signal or the second optical signal, where a phase difference between the first optical signal and the second optical signal on which the phase shift is performed is $\pi/2$ or remains unchanged; and a combination module, configured to perform optical signal combination with the polarization state preserved on the first optical signal and the second optical signal after the polarization state control and the phase shift and output a PDM-BPSK modulation optical signal or a QPSK modulation optical signal.

According to the method and apparatus for implementing the PDM-BPSK modulation and the QPSK modulation in the compatible manner according to the embodiments of the present invention, the polarization state control is performed on the first optical signal, the phase shift is performed on the first optical signal or the second optical signal, and the optical signal combination with the polarization state preserved is performed on the first optical signal and the second optical signal after the polarization state control and the phase shift. In this way, the PDM-BPSK modulation optical signal or the QPSK modulation optical signal may be output based on a relationship between the polarization state of the first optical signal and that of the second optical signal, and the phase difference between the first optical signal and the second optical signal. Embodiments of the present invention may implement the two types of modulation manner PDM-BPSK and QPSK in the compatible manner, which saves the design cost and increases modulation flexibility.

BRIEF DESCRIPTION OF THE DRAWINGS

To make the technical solutions in embodiments of the present invention or in the prior art clearer, the following briefly describes the accompanying drawings involved in the description of the embodiments or the prior art. Apparently, the accompanying drawings described below illustrates only some embodiments of the present invention, and persons of ordinary skill in the art can derive other accompanying drawings from these accompanying drawings without any creative effort.

DETAILED DESCRIPTION OF THE EMBODIMENTS

The following clearly and completely describes the technical solutions in the embodiments of the present invention with reference to the accompanying drawings. Evidently, the described embodiments are merely a part of the embodiments of the present invention rather than all embodiments of the present invention. All other embodiments, which can be derived by those skilled in the art from the embodiments given herein without any creative effort, shall fall within the protection scope of the present invention.

To make advantages of the technical solutions of the present invention clearer, the following describes the present invention in detail with reference to the accompanying drawings and the embodiments.

Embodiment 1

Figure 1:
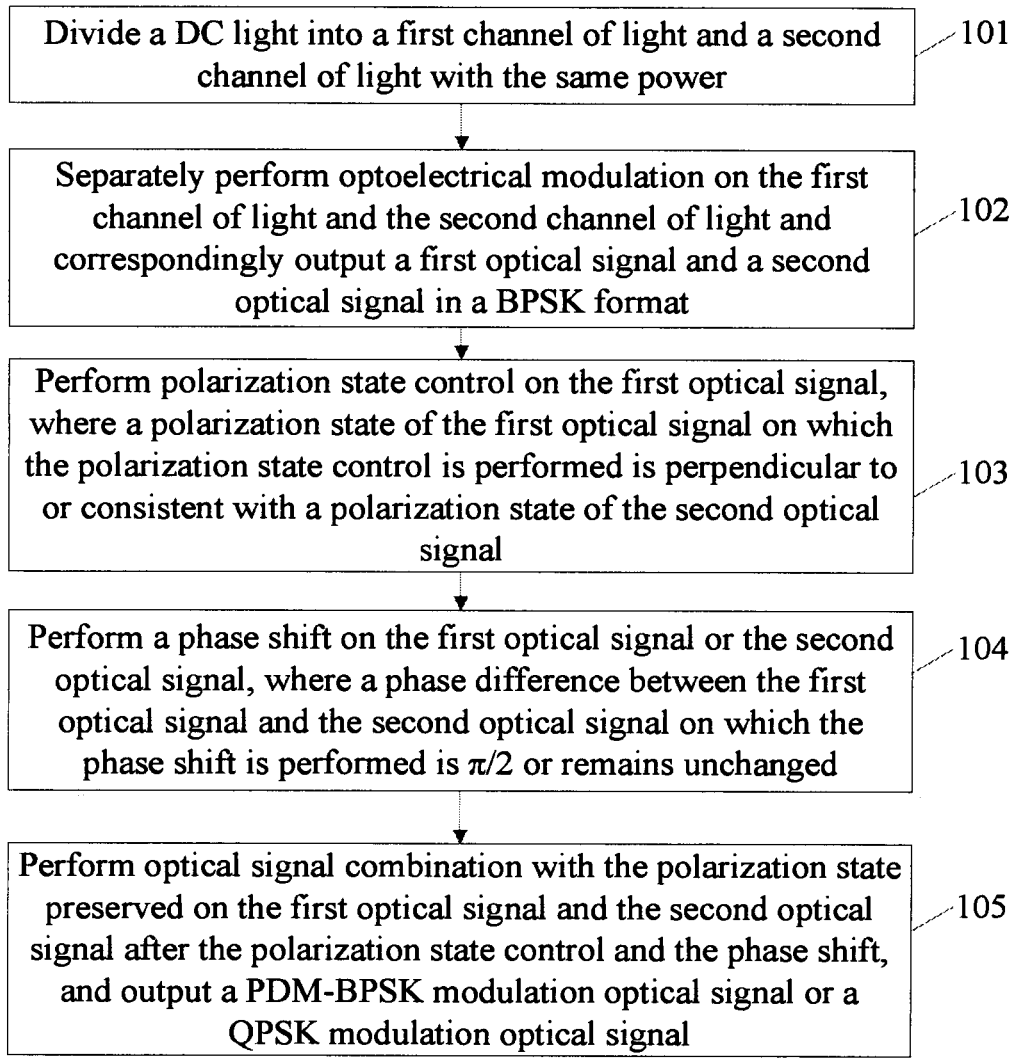
FIG. 1 is a flowchart of a method according to a first embodiment of the present invention.

An embodiment of the present invention provides a method for implementing PDM-BPSK modulation and QPSK modulation in a compatible manner. As shown in FIG. 1, the method includes:

101. divide a DC light into a first channel of light and a second channel of light with the same power;

102. separately perform optoelectrical modulation on the first channel of light and the second channel of light and correspondingly output a first optical signal and a second optical signal in a BPSK (Binary Phase Shift Keying, binary phase shift keying) format;

103. perform polarization state control on the first optical signal, where a polarization state of the first optical signal on which the polarization state control is performed is perpendicular to or consistent with a polarization state of the second optical signal;

104. perform a phase shift on the first optical signal or the second optical signal, where a phase difference between the first optical signal and the second optical signal on which the phase shift is performed is $\pi/2$ or remains unchanged; and 105. perform optical signal combination with the polarization state preserved on the first optical signal and the second optical signal after the polarization state control and the phase shift and output a PDM-BPSK modulation optical signal or a QPSK modulation optical signal.

In the method for implementing the PDM-BPSK modulation and the QPSK modulation in a compatible manner according to this embodiment of the present invention, the polarization state control is performed on the first optical signal, the phase shift is performed on the first optical signal or the second optical signal, and the optical signal combination with the polarization state preserved is performed on the first optical signal and the second optical signal after the polarization state control and the phase shift. In this way, the PDM-BPSK modulation optical signal or the QPSK modulation optical signal may be output based on a relationship between the polarization state of the first optical signal and that of the second optical signal, and the phase difference between the first optical signal and the second optical signal. Embodiments of the present invention may implement the two types of modulation manner PDM-BPSK and QPSK in the compatible manner, which saves a design cost and increases modulation flexibility.

Embodiment 2

This embodiment takes generating a 40 Gb/s QPSK optical signal and a 40 Gb/s PDM-BPSK optical signal from compatible modulation as an example. For a case of another bit rate, refer to this embodiment. A light transmission manner may use a space optical coupling method or a silicon-based PLC (Plan Lightwave Circuits, plan lightwave circuits) method.

Figure 2:
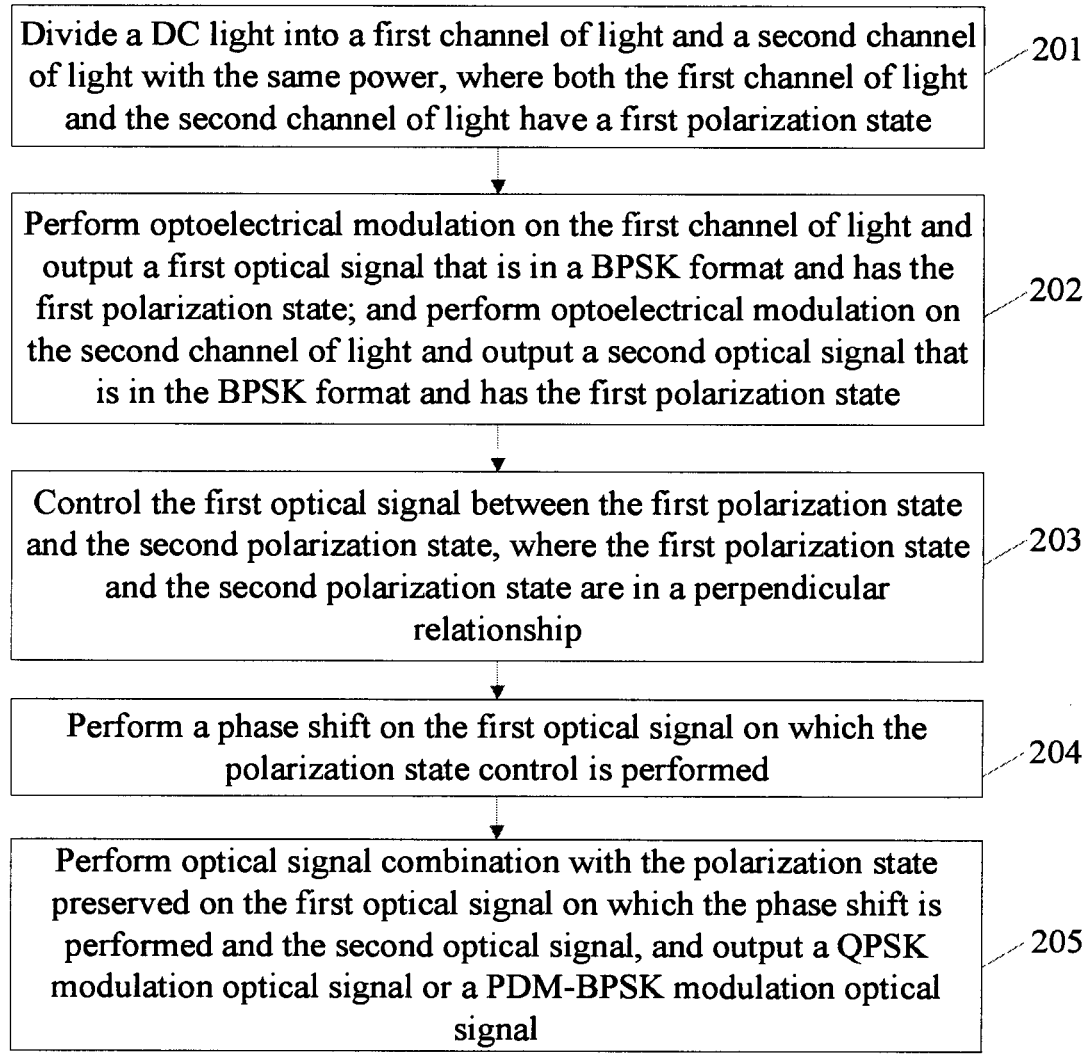
FIG. 2 is a flowchart of a method according to a second embodiment of the present invention.

As shown in FIG. 2, a method for implementing PDM-BPSK modulation and QPSK modulation in a compatible manner includes:

201. Divide a DC light into a first channel of light and a second channel of light with the same power, where both the first channel of light and the second channel of light have a first polarization state.

The DC light may be output by, but not limited to, an LD (Laser Diode, laser diode).

In this embodiment, a PS (Power Splitter, power splitter) may be used to split the DC light. When the space optical coupling method is used, an input light is reflected and penetrated by a mirror and is split into two beams of output lights; when the silicon-based PLC method is used, the light is output through a silicon-based Y-type optical waveguide. Other suitable process may be used, and it is not limited to the preceding manners.

202. Perform optoelectrical modulation on the first channel of light and output a first optical signal that is in a BPSK format and has the first polarization state; and perform optoelectrical modulation on the second channel of light and output a second optical signal that is in the BPSK format and has the first polarization state.

Specifically, the following manner may be employed to perform the optoelectrical modulation:

Inject the first channel of light into a first MZM (MachZender Modulator, MachZender modulator) and set a DC offset of the first MZM as the lowest point of a transmission curve. Use two channels of 20 Gb/s electrical signal to drive the first MZE in a differentiation manner respectively to perform phase modulation on the first channel of light and output the first 20 Gb/s optical signal that is in the BPSK format and has the first polarization state. The MZM may be implemented by employing, but not limited to, lithium niobate materials.

Inject the second channel of light into a second MZM (MachZender Modulator, MachZender modulator) and set a DC offset of the second MZM as the lowest point of a transmission curve. Use two channels of 20 Gb/s electrical signals to drive the second MZE in a differentiation manner respectively to perform the phase modulation on the second channel of light and output the second 20 Gb/s optical signal that is in the BPSK format and has the first polarization state. The MZM may be implemented by employing, but not limited to, the lithium niobate materials.

The optoelectrical modulation manners are not limited to the foregoing and the optoelectrical modulation may be performed by employing another manner.

203. Control the first optical signal between the first polarization state and a second polarization state, where the first polarization state and the second polarization state are in a perpendicular relationship.

For the first optical signal on which the polarization state control is performed, two cases exist:

case 1: The first optical signal on which the polarization state control is performed has the first polarization state; and case 2: The first optical signal on which the polarization state control is performed has the second polarization state.

Specifically, the following manner may be employed to perform the polarization state control:

Perform the polarization state control by setting a work state of an OPC (Optical Polarization Controller, optical polarization controller). When using the space optical coupling method, insert a half-wave plate in a space optical channel and rotate an axial position of the half-wave plate. When an axis direction of the half-wave plate is the same as the optical polarization state, an output polarization state and an input polarization state are the same; when an included angle between the axis direction of the half-wave plate and the optical polarization state is 45 degrees, the output polarization state and the input polarization state are in the perpendicular relationship. When using the silicon-based PLC method, implement the polarization state control by integrating a lithium-niobate-based electrical control cascading wave plate on a silicon substrate and exerting a proper power supply on the wave plate.

The polarization state control manners are not limited to the foregoing and the polarization state control may be performed by employing another manner.

204. Perform a phase shift on the first optical signal on which the polarization state control is performed.

Corresponding to case 1, when the first optical signal on which the polarization state control is performed has the first polarization state, perform the phase shift on the first optical signal so that a phase difference between the first optical signal and the second optical signal is $\pi/2$.

Corresponding to case 2, when the first optical signal on which the polarization state control is performed has the second polarization state, an optical carrier phase of the first optical signal may be an arbitrary value. That is to say, the phase shift may not be performed on the first optical signal. That is, the phase difference between the second optical signal on which the phase shift is performed and the first optical signal remains unchanged.

Specifically, the following manner may be employed to perform the phase shift:

Change a carrier phase of an optical signal by adjusting an OPS (Optical Phase Shifter, optical phase shifter). When using the space optical coupling method, change the carrier phase of the optical signal by performing a fine adjustment on an optical path of the space optical channel; when using the silicon-based PLC method, heat the silicon-based optical waveguide to change a material refractive index of the optical waveguide and thereby change the carrier phase of the optical signal.

The phase shift manners are not limited to the foregoing and the phase shift may be performed by employing another manner.

205. Perform optical signal combination with the polarization state preserved on the first optical signal on which the phase shift is performed and the second optical signal, and output a QPSK modulation or a PDM-BPSK modulation optical signal.

The optical signal combination with the polarization state preserved refers to that two channels of optical signal are able to be combined regardless of which polarization state the two channels of optical signal have, and during the optical signal combination, the two channels of optical signal are able to be transmitted stably and polarization states of the two channels of optical signal remain unchanged.

Corresponding to case 1, when both the first optical signal and the second optical signal have the first polarization state and the phase difference between the first optical signal on which the phase shift is performed and the second optical signal is $\pi/2$, output a 40 Gb/s QPSK modulation optical signal that has the first polarization state after performing the optical signal combination with the polarization state preserved on the first optical signal and the second optical signal.

Corresponding to case 2, when the first optical signal has the second polarization state, the second optical signal has the first polarization state, and the phase difference between the first optical signal on which the phase shift is performed and the second optical signal is an arbitrary value, output a 40 Gb/s PDM-BPSK modulation optical signal after performing the optical signal combination with the polarization state preserved on the first optical signal and the second optical signal.

Specifically, the following manner may be employed to perform the optical signal combination:

Use a PC (Power Combiner, power combiner) with a polarization preserving function and a coupling function. When using the space optical coupling method, combine two beams of input light into one beam of light through a reflection or penetration manner; when using a planar waveguide coupling method, combine optical signals by using a planar waveguide manner in a silicon-based Y-type waveguide component.

The optical signal combination manners are not limited to the foregoing and the optical signal combination may also be performed by employing another manner.

In the method for implementing the PDM-BPSK modulation and the QPSK modulation in the compatible manner according to this embodiment of the present invention, the polarization state control is performed on the first optical signal, the phase shift is performed on the first optical signal on which the polarization state control is performed, and the optical signal combination with the polarization state preserved is performed on the first optical signal on which the phase shift is performed and the second optical signal. In this way, the PDM-BPSK modulation optical signal or the QPSK modulation optical signal may be output based on a relationship between the polarization state of the first optical signal and that of the second optical signal, and the phase difference between the first optical signal and the second optical signal. Embodiments of the present invention may implement the two types of modulation manner PDM-BPSK and QPSK in the compatible manner, which saves a design cost and increases modulation flexibility.

Embodiment 3

This embodiment takes generating a 40 Gb/s QPSK optical signal and a 40 Gb/s PDM-BPSK optical signal from compatible modulation as an example. For a case of another bit rate, refer to this embodiment.

Figure 3:
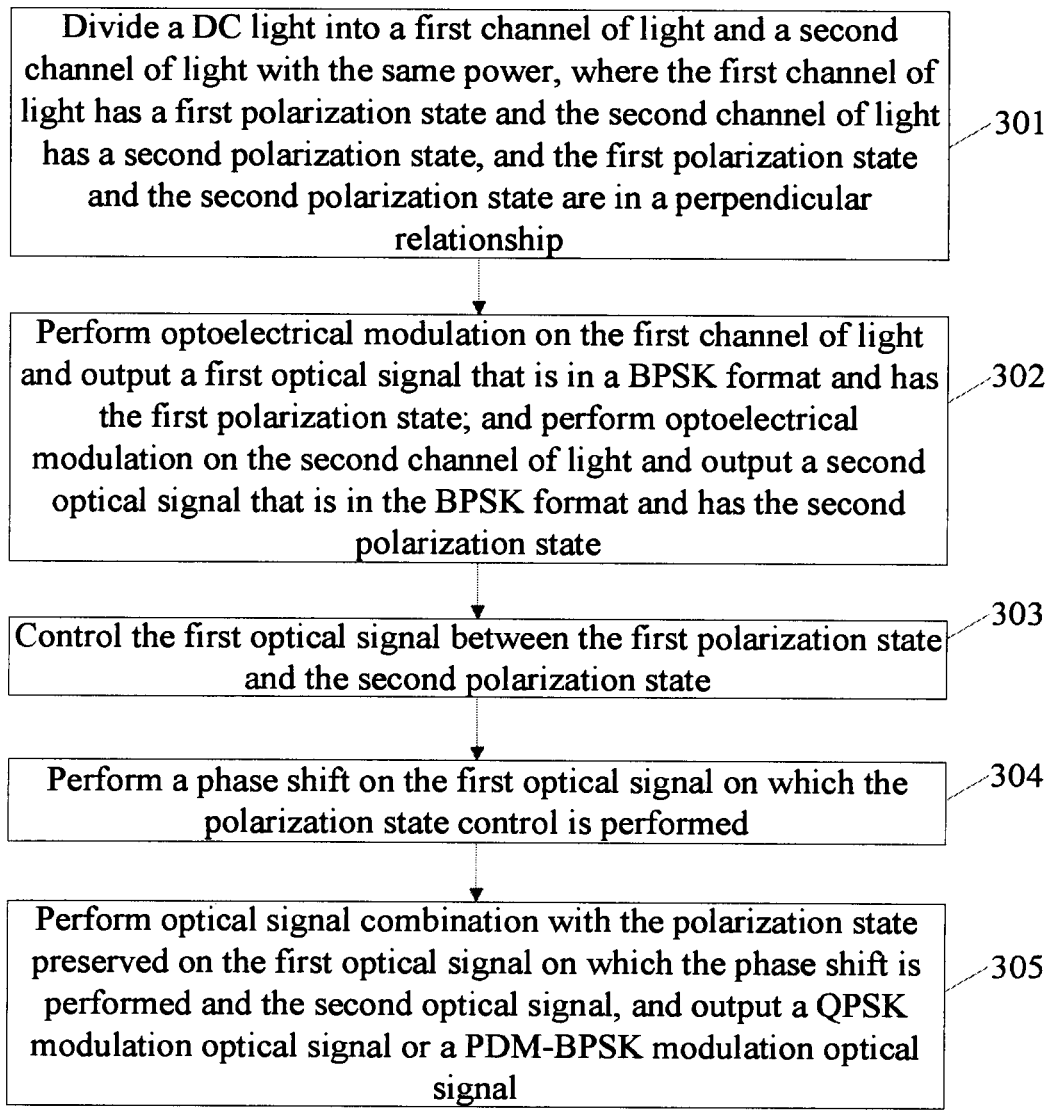
FIG. 3 is a flowchart of a method according to a third embodiment of the present invention.

As shown in FIG. 3, a method for implementing PDM-BPSK modulation and QPSK modulation in a compatible manner includes:

301. Divide a DC light into a first channel of light and a second channel of light with the same power, where the first channel of light has a first polarization state and the second channel of light has a second polarization state, and the first polarization state and the second polarization state are in a perpendicular relationship.

The DC light may be output by, but not limited to, an LD.

In this embodiment, a PBS (Polarization Beam Splitter, polarization beam splitter) may be used to split the DC light. Definitely, it is not limited to the PBS.

302. Perform optoelectrical modulation on the first channel of light and output a first optical signal that is in a BPSK format and has the first polarization state; and perform optoelectrical modulation on the second channel of light and output a second optical signal that is in the BPSK format and has the second polarization state.

For a manner of the optoelectrical modulation, refer to the description in step 202.

303. Control the first optical signal between the first polarization state and the second polarization state.

For the first optical signal on which the polarization state control is performed, two cases exist:

case 1: The first optical signal on which the polarization state control is performed has the first polarization state; and case 2: The first optical signal on which the polarization state control is performed has the second polarization state.

For a manner of the polarization state control, refer to the description in step 203.

304. Perform a phase shift on the first optical signal on which the polarization state control is performed.

Corresponding to scenario 1, when the first optical signal on which the polarization state control is performed has the first polarization state, an optical carrier phase of the first optical signal may be an arbitrary value. That is to say, the phase shift may not be performed on the first optical signal. That is, the phase difference between the second optical signal on which the phase shift is performed and the first optical signal remains unchanged.

Corresponding to case 2, when the first optical signal on which the polarization state control is performed has the second polarization state, perform the phase shift on the first optical signal so that a phase difference between the first optical signal and the second optical signal is $\pi/2$.

For a manner of the phase shift, refer to the description in step 204.

305. Perform optical signal combination with the polarization state preserved on the first optical signal on which the phase shift is performed and the second optical signal, and output a QPSK modulation optical signal or a PDM-BPSK modulation optical signal.

Corresponding to scenario 1, when the first optical signal has the first polarization state, the second optical signal has the second polarization state, and the phase difference between the first optical signal on which the phase shift is performed and the second optical signal is an arbitrary value, output a 40 Gb/s PDM-BPSK modulation optical signal after performing the optical signal combination with the polarization state preserved on the first optical signal and the second optical signal.

Corresponding to scenario 2, when both the first optical signal and the second optical signal have the second polarization state and the phase difference between the first optical signal on which the phase shift is performed and the second optical signal is $\pi/2$, output a 40 Gb/s QPSK modulation optical signal that has the second polarization state after performing the optical signal combination with the polarization state preserved on the first optical signal and the second optical signal.

For a manner of the optical signal combination, refer to the description in step 205.

In the method for implementing the PDM-BPSK modulation and the QPSK modulation in the compatible manner according to this embodiment of the present invention, the polarization state control is performed on the first optical signal, the phase shift is performed on the first optical signal on which the polarization state control is performed, and the optical signal combination with the polarization state preserved is performed on the first optical signal on which the phase shift is performed and the second optical signal. In this way, the PDM-BPSK modulation optical signal or the QPSK modulation optical signal may be output based on a relationship between the polarization state of the first optical signal and that of the second optical signal, and the phase difference between the first optical signal and the second optical signal. Embodiments of the present invention may implement the two types of modulation manner PDM-BPSK and QPSK in the compatible manner, which saves a design cost and increases modulation flexibility.

Embodiment 4

This embodiment takes generating a 40 Gb/s QPSK optical signal and a 40 Gb/s PDM-BPSK optical signal from compatible modulation as an example. For a case of another bit rate, refer to this embodiment.

Figure 4:
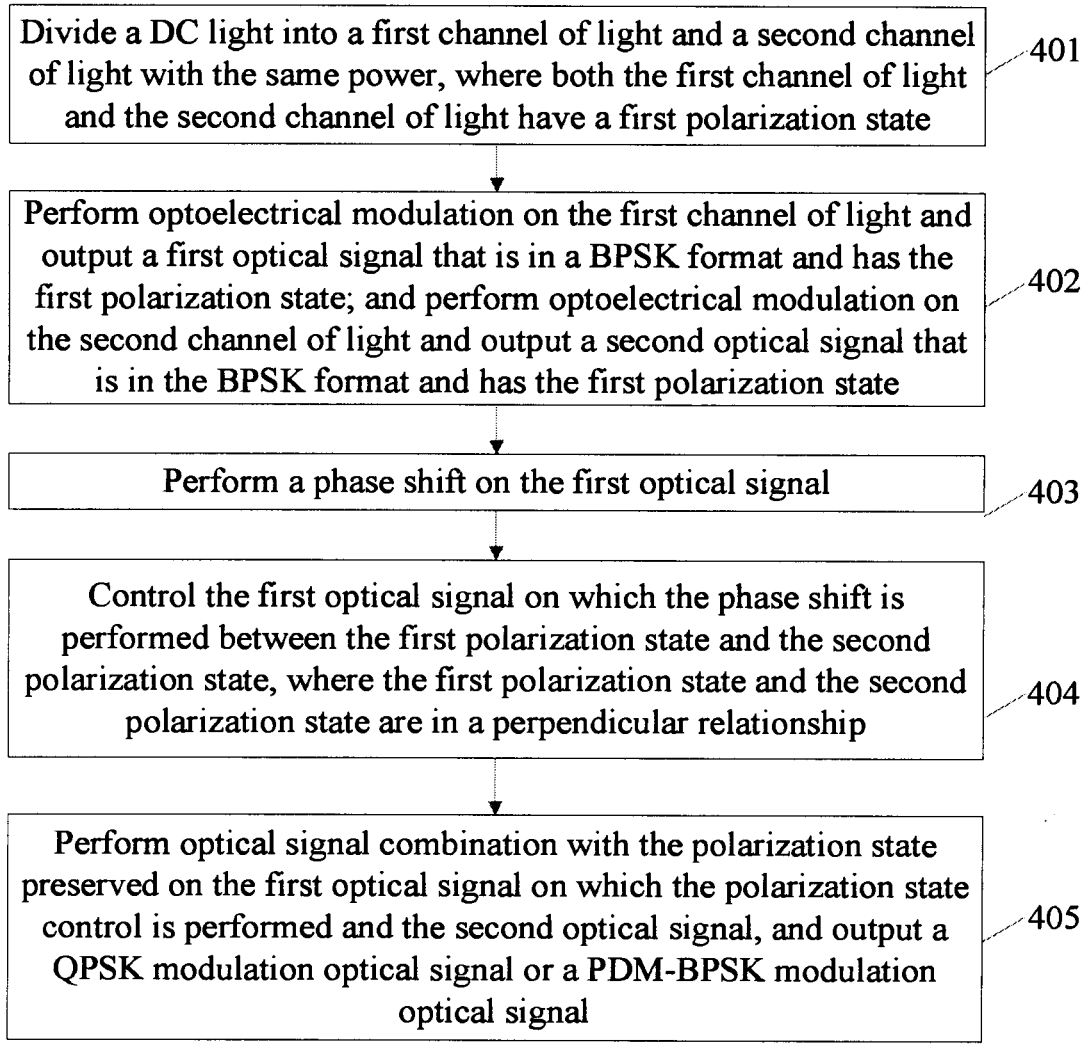
FIG. 4 is a flowchart of a method according to a fourth embodiment of the present invention.

As shown in FIG. 4, a method for implementing PDM-BPSK modulation and QPSK modulation in a compatible manner includes:

For 401 and 402, refer to step 201 and step 202, which are not described here.

403. Perform a phase shift on the first optical signal.

For the first optical signal on which the phase shift is performed, two cases exist:

case 1: A phase difference between the first optical signal on which the phase shift is performed and the second optical signal is $\pi/2$; and case 2: The phase difference between the first optical signal on which the phase shift is performed and the second optical signal is an arbitrary value. That is to say, the phase shift may not be performed on the first optical signal. That is, the phase difference between the second optical signal on which the phase shift is performed and the first optical signal remains unchanged.

For a manner of the phase shift, refer to the description in step 204.

404. Control the first optical signal on which the phase shift is performed between a first polarization state and a second polarization state, where the first polarization state and the second polarization state are in a perpendicular relationship.

Corresponding to case 1, when the phase difference between the first optical signal on which the phase shift is performed and the second optical signal is π/2, control the first optical signal to have the first polarization state.

Corresponding to case 2, when the phase difference between the first optical signal on which the phase shift is performed and the second optical signal is an arbitrary value, control the first optical signal to have the second polarization state.

For a manner of the polarization state control, refer to the description in step 203.

405. Perform optical signal combination with the polarization state preserved on the first optical signal on which the polarization state control is performed and the second optical signal, and output a QPSK modulation optical signal or a PDM-BPSK modulation optical signal.

Corresponding to case 1, when both the first optical signal and the second optical have the first polarization state and the phase difference between the first optical signal on which the phase shift is performed and the second optical signal is π/2, output a 40 Gb/s QPSK modulation optical signal that has the first polarization state after performing the optical signal combination with the polarization state preserved on the first optical signal and the second optical signal.

Corresponding to case 2, when the first optical signal has the second polarization state, the second optical signal has the first polarization state, and the phase difference between the first optical signal on which the phase shift is performed and the second optical signal is an arbitrary value, output a 40 Gb/s PDM-BPSK modulation optical signal after performing the optical signal combination with the polarization state preserved on the first optical signal and the second optical signal.

For a manner of the optical signal combination, refer to the description in step 205.

In the method for implementing the PDM-BPSK modulation and the QPSK modulation in the compatible manner according to this embodiment of the present invention, the phase shift is performed on the first optical signal, the polarization state control is performed on the first optical signal on which the phase shift is performed, and the optical signal combination with the polarization state preserved is performed on the first optical signal on which the polarization state control is performed and the second optical signal. In this way, the PDM-BPSK modulation optical signal or the QPSK modulation optical signal may be output based on a relationship between the polarization state of the first optical signal and that of the second optical signal, and the phase difference between the first optical signal and the second optical signal. Embodiments of the present invention may implement the two types of modulation manner PDM-BPSK and QPSK in the compatible manner, which saves a design cost and increases modulation flexibility.

Embodiment 5

This embodiment takes generating a 40 Gb/s QPSK optical signal and a 40 Gb/s PDM-BPSK optical signal from compatible modulation as an example. For a case of another bit rate, refer to this embodiment.

Figure 5:
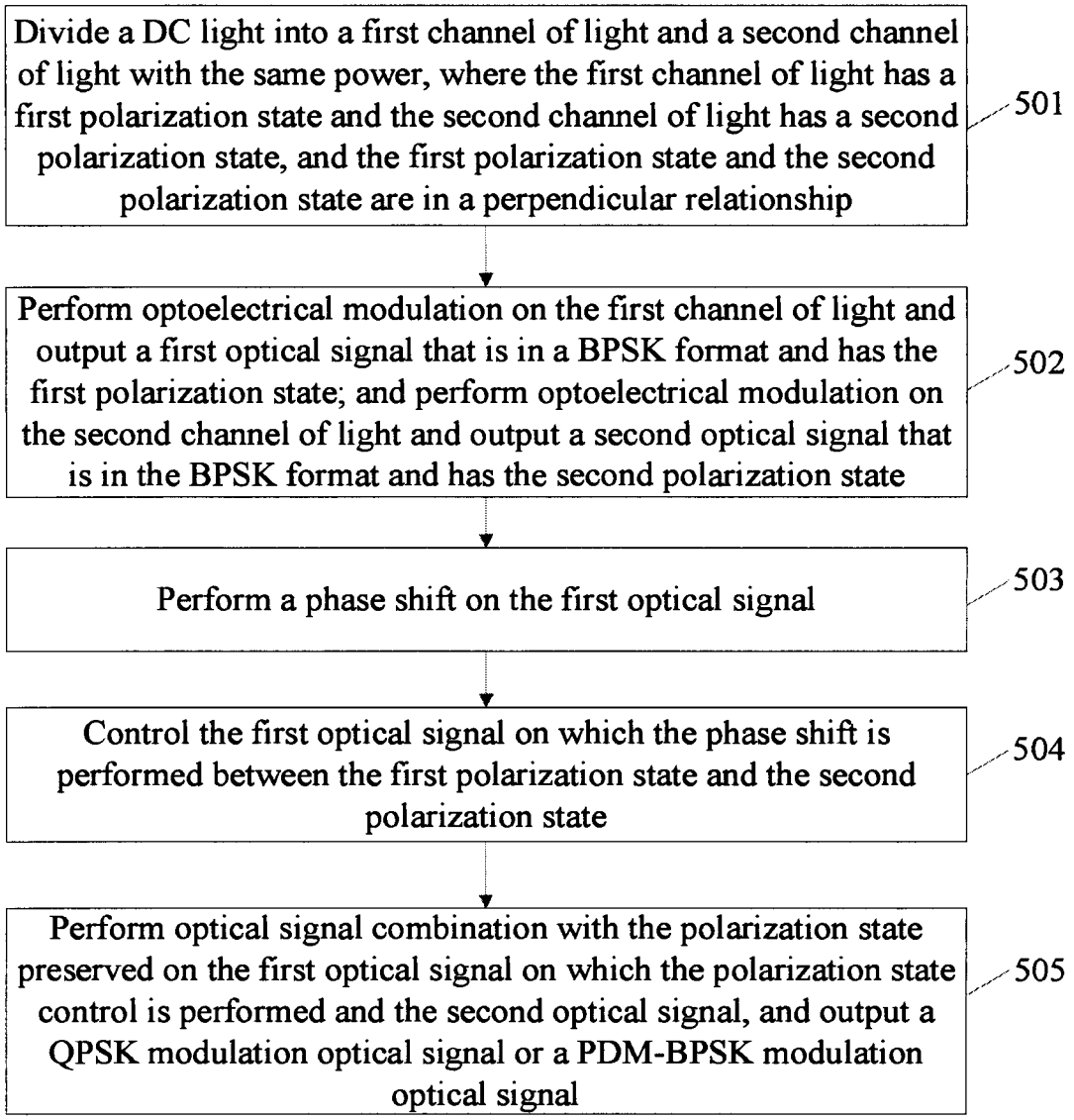
FIG. 5 is a flowchart of a method according to a fifth embodiment of the present invention.

As shown in FIG. 5, a method for implementing PDM-BPSK modulation and QPSK modulation in a compatible manner includes:

For 501 and 502, refer to step 301 and step 302, which are not described here.

503. Perform a phase shift on the first optical signal.

For the first optical signal on which the phase shift is performed, two cases exist:

case 1: A phase difference between the first optical signal on which the phase shift is performed and the second optical signal is π/2; and case 2: The phase difference between the first optical signal on which the phase shift is performed and the second optical signal is an arbitrary value. That is to say, the phase shift may not be performed on the first optical signal. That is, the phase difference between the second optical signal on which the phase shift is performed and the first optical signal remains unchanged.

For a manner of the phase shift, refer to the description in step 204.

504. Control the first optical signal on which the phase shift is performed between a first polarization state and a second polarization state.

Corresponding to case 1, when the phase difference between the first optical signal on which the phase shift is performed and the second optical signal is π/2, control the first optical signal to have the second polarization state.

Corresponding to case 2, when the phase difference between the first optical signal on which the phase shift is performed and the second optical signal is an arbitrary value, control the first optical signal to have the first polarization state.

For a manner of the polarization state control, refer to the description in step 203.

505. Perform optical signal combination with the polarization state preserved on the first optical signal on which the polarization state control is performed and the second optical signal, and output a QPSK modulation optical signal or a PDM-BPSK modulation optical signal.

Corresponding to case 1, when both the first optical signal and the second optical have the second polarization state and the phase difference between the first optical signal on which the phase shift is performed and the second optical signal is π/2, output a 40 Gb/s QPSK modulation optical signal that has the second polarization state after performing the optical signal combination with the polarization state preserved on the first optical signal and the second optical signal.

Corresponding to case 2, when the first optical signal has the first polarization state, the second optical signal has the second polarization state, and the phase difference between the first optical signal on which the phase shift is performed and the second optical signal is an arbitrary value, output a 40 Gb/s PDM-BPSK modulation optical signal after performing the optical signal combination with the polarization state preserved on the first optical signal and the second optical signal.

For a manner of the optical signal combination, refer to the description in step 205.

In the method for implementing the PDM-BPSK modulation and the QPSK modulation in the compatible manner according to this embodiment of the present invention, the phase shift is performed on the first optical signal, the polarization state control is performed on the first optical signal on which the phase shift is performed, and the optical signal combination with the polarization state preserved is performed on the first optical signal on which the polarization state control is performed and the second optical signal. In this way, the PDM-BPSK modulation optical signal or the QPSK modulation optical signal may be output based on a relationship between the polarization state of the first optical signal and that of the second optical signal, and the phase difference between the first optical signal and the second optical signal. Embodiments of the present invention may implement the two types of modulation manner PDM-BPSK and QPSK in the compatible manner, which saves a design cost and increases modulation flexibility.

Embodiment 6

This embodiment takes generating a 40 Gb/s QPSK optical signal and a 40 Gb/s PDM-BPSK optical signal from compatible modulation as an example. For a case of another bit rate, refer to this embodiment.

Figure 6:
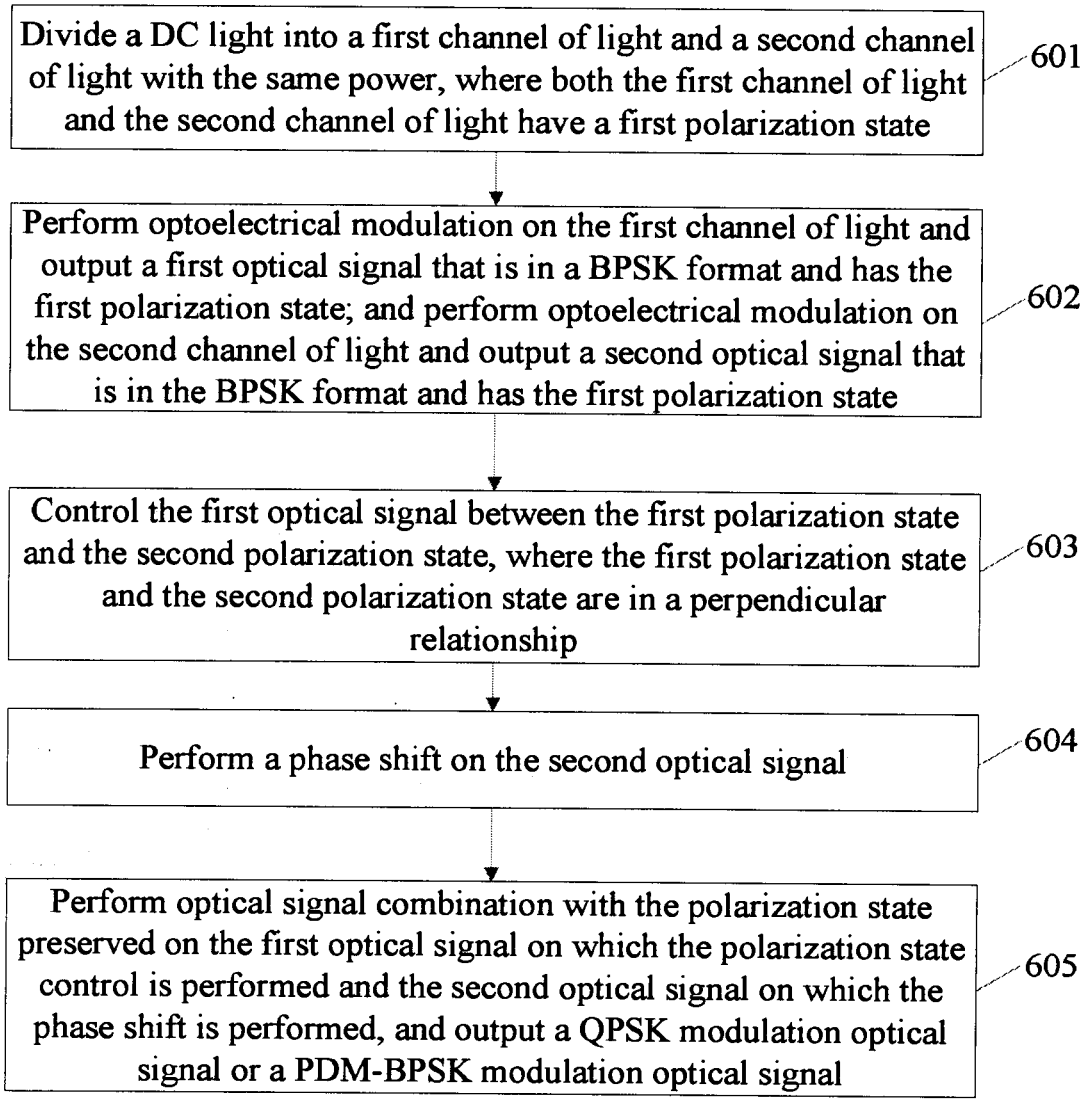
FIG. 6 is a flowchart of a method according to a sixth embodiment of the present invention.

As shown in FIG. 6, a method for implementing PDM-BPSK modulation and QPSK modulation in a compatible manner includes:

For 601 and 602, refer to step 201 and step 202, which are not described here.

603. Control the first optical signal between a first polarization state and a second polarization state, where the first polarization state and the second polarization state are in a perpendicular relationship.

For the first optical signal on which the polarization state control is performed, two cases exist:

case 1: The first optical signal on which the polarization state control is performed has the first polarization state; and case 2: The first optical signal on which the polarization state control is performed has the second polarization state.

For a manner of the polarization state control, refer to the description in step 203.

604. Perform a phase shift on the second optical signal.

Corresponding to case 1, when the first optical signal on which the polarization state control is performed has the first polarization state, perform the phase shift on the second optical signal so that a phase difference between the second optical signal and the first optical signal is $\pi/2$.

Corresponding to case 2, when the first optical signal on which the polarization state control is performed has the second polarization state, an optical carrier phase of the second optical signal may be an arbitrary value. That is to say, the phase shift may not be performed on the second optical signal. That is, the phase difference between the second optical signal on which the phase shift is performed and the first optical signal remains unchanged.

For a manner of the phase shift, refer to the description in step 204.

605. Perform optical signal combination with the polarization state preserved on the first optical signal on which the polarization state control is performed and the second optical signal on which the phase shift is performed, and output a QPSK modulation optical signal or a PDM-BPSK modulation optical signal.

Corresponding to case 1, when both the first optical signal and the second optical have the first polarization state and the phase difference between the second optical signal on which the phase shift is performed and the first optical signal on which the polarization state control is performed is $\pi/2$, output a 40 Gb/s QPSK modulation optical signal that has the first state after performing the optical signal combination with the polarization state preserved on the first optical signal and the second optical signal.

Corresponding to case 2, when the first optical signal has the second polarization state, the second optical signal has the first polarization state, and the phase difference between the second optical signal on which the phase shift is performed and the first optical signal on which the polarization state control is performed is an arbitrary value, output a 40 Gb/s PDM-BPSK modulation optical signal after performing the optical signal combination with the polarization state preserved on the first optical signal and the second optical signal.

For a manner of the optical signal combination, refer to the description in step 205.

In the method for implementing the PDM-BPSK modulation and the QPSK modulation in the compatible manner according to this embodiment of the present invention, the polarization state control is performed on the first optical signal, the phase shift is performed on the second optical signal, and the optical signal combination with the polarization state preserved is performed on the first optical signal on which the polarization state control is performed and the second optical signal on which the phase shift is performed. In this way, the PDM-BPSK modulation optical signal or the QPSK modulation optical signal may be output based on a relationship between the polarization state of the first optical signal and that of the second optical signal, and the phase difference between the first optical signal and the second optical signal. Embodiments of the present invention may implement the two types of modulation manner PDM-BPSK and QPSK in the compatible manner, which saves a design cost and increases modulation flexibility.

Embodiment 7

This embodiment takes generating a 40 Gb/s QPSK optical signal and a 40 Gb/s PDM-BPSK optical signal from compatible modulation as an example. For a case of another bit rate, refer to this embodiment.

Figure 7:
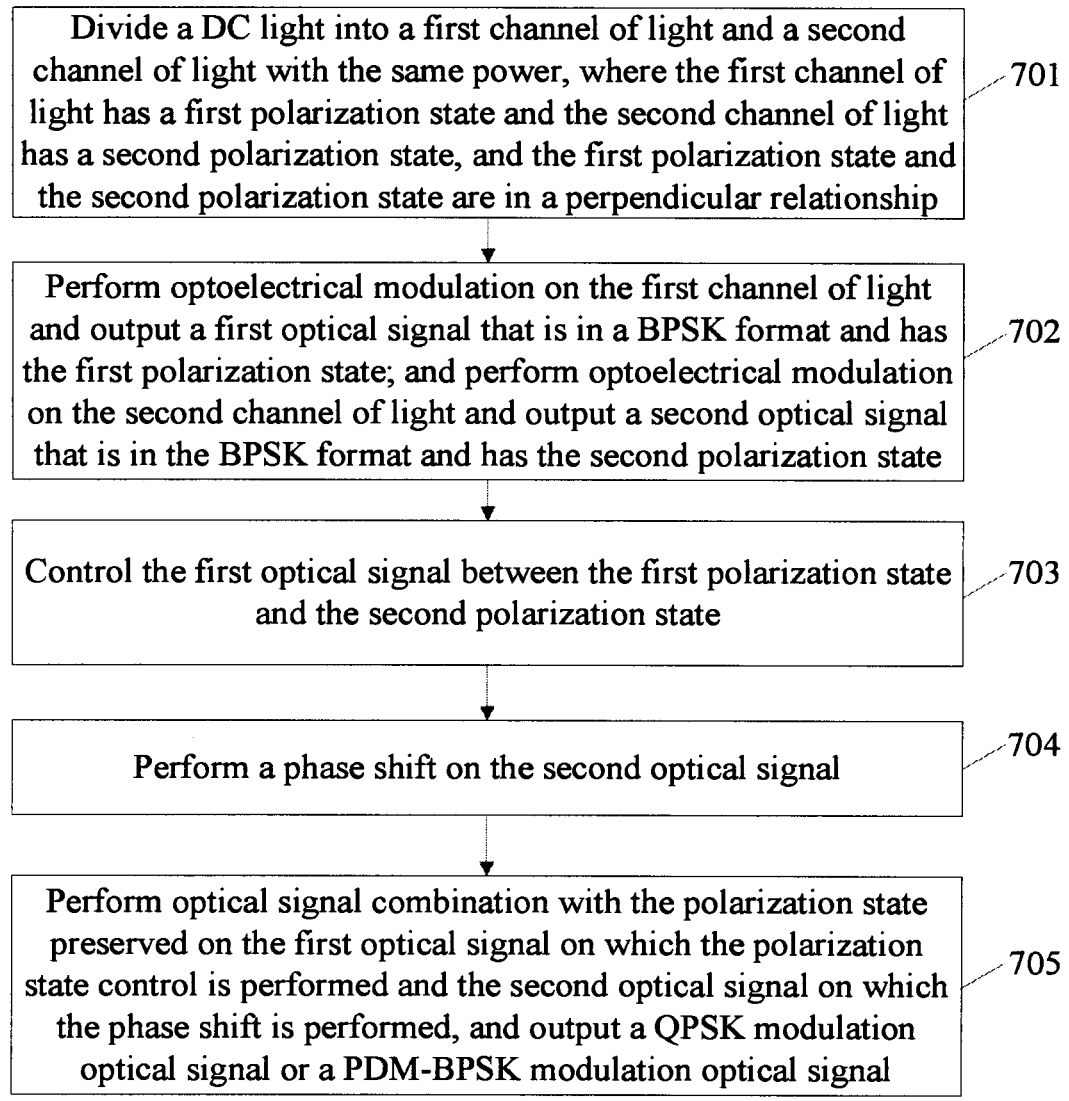
FIG. 7 is a flowchart of a method according to a seventh embodiment of the present invention.

As shown in FIG. 7, a method for implementing PDM-BPSK modulation and QPSK modulation in a compatible manner includes:

For 701 and 702, refer to step 301 and step 302, which are not described here.

703. Control the first optical signal between a first polarization state and a second polarization state.

For the first optical signal on which the polarization state control is performed, two cases exist:

case 1: The first optical signal on which the polarization state control is performed has the first polarization state; and case 2: The first optical signal on which the polarization state control is performed has the second polarization state.

For a manner of the polarization state control, refer to the description in step 203.

704. Perform a phase shift on the second optical signal.

Corresponding to case 1, when the first optical signal on which the polarization state control is performed has the first polarization state, an optical carrier phase of the second optical signal may be an arbitrary value. That is to say, the phase shift may not be performed on the second optical signal. That is, a phase difference between the second optical signal on which the phase shift is performed and the first optical signal remains unchanged.

Corresponding to case 2, when the first optical signal on which the polarization state control is performed has the second polarization state, perform the phase shift on the second optical signal so that the phase difference between the second optical signal and the first optical signal is $\pi/2$.

For a manner of the phase shift, refer to the description in step 204.

705. Perform optical signal combination with the polarization state preserved on the first optical signal on which the polarization state control is performed and the second optical signal on which the phase shift is performed, and output a QPSK modulation optical signal or a PDM-BPSK modulation optical signal.

Corresponding to case 1, when the first optical signal has the first polarization state, the second optical signal has the second polarization state, and the phase difference between the second optical signal on which the phase shift is performed and the first optical signal on which the polarization state control is performed is an arbitrary value, output a 40 Gb/s PDM-BPSK modulation optical signal after performing the optical signal combination with the polarization state preserved on the first optical signal and the second optical signal.

Corresponding to case 2, when both the first optical signal and the second optical have the second polarization state and the phase difference between the second optical signal on which the phase shift is performed and the first optical signal on which the polarization state control is performed is $\pi/2$, output a 40 Gb/s QPSK modulation optical signal that has the first polarization mode after performing the optical signal combination with the polarization state preserved on the first optical signal and the second optical signal.

For a manner of the optical signal combination, refer to the description in step 205.

In the method for implementing the PDM-BPSK modulation and the QPSK modulation in the compatible manner according to this embodiment of the present invention, the polarization state control is performed on the first optical signal, the phase shift is performed on the second optical signal, and the optical signal combination with the polarization state preserved is performed on the first optical signal on which the polarization state control is performed and the second optical signal on which the phase shift is performed. In this way, the PDM-BPSK modulation optical signal or the QPSK modulation mode optical signal may be output based on a relationship between the polarization state of the first optical signal and the polarization state of the second optical signal, and the phase difference between the first optical signal and the second optical signal. Embodiments of the present invention may implement the two types of modulation manner PDM-BPSK and QPSK in the compatible manner, which saves a design cost and increases modulation flexibility.

Embodiment 8

In this embodiment, modules may be connected using a space optical coupling method or a silicon-based PLC method.

Figure 8:
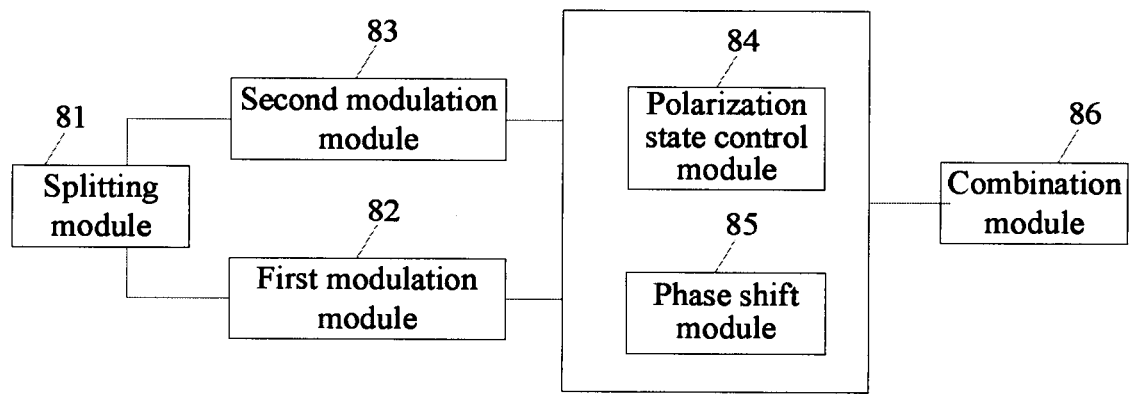
FIG. 8 is a schematic structural diagram of an apparatus according to an eighth embodiment of the present invention.

This embodiment provides an apparatus for implementing PDM-BPSK modulation and QPSK modulation in a compatible manner. As shown in FIG. 8, the apparatus includes a splitting module 81, a first modulation module 82, a second modulation module 83, a polarization state control module 84, a phase shift module 85, and a combination module 86.

The splitting module 81 is configured to divide a DC light into a first channel of light and a second channel of light with the same power.

The DC light may be output by, but not limited to, an LD.

The splitter module 81 may be implemented by employing a PS. When the space optical coupling method is used, an input light is reflected and penetrated by a mirror and is divided into two beams of light; when the silicon-based PLC method is used, the light is output through a silicon-based Y-type optical waveguide. Definitely, the splitter module 81 may also be implemented by employing another component.

The first modulation module 82 is configured to perform optoelectrical modulation on the first channel of light and output a first optical signal in a BPSK format.

The first modulation module 82 may be implemented by employing an MZM. A DC offset of the MZM is set as the lowest point of a transmission curve. Two channels of electrical signal with the same bit rate are used to drive the MZE in a differentiation manner respectively to perform phase modulation on the first channel of light and output the first optical signal that is in the BPSK format and of the bit rate, and whose polarization state is unchanged. The MZM may be implemented by employing, but not limited to, lithium niobate materials. Definitely, the first modulation module 82 may also be implemented by employing another component.

The second modulation module 83 is configured to perform optoelectrical modulation on the second channel of light and output a second optical signal in the BPSK format.

The second modulation module 83 may be implemented by employing an MZM. A DC offset of the MZM is set as the lowest point of a transmission curve. Two channels of electrical signal with the same bit rate are used to drive the MZE in the differentiation manner respectively to perform phase modulation on the second channel of light and output the second optical signal that is in the BPSK format and of the bit rate, and whose polarization state is unchanged. The MZM may be implemented by employing, but not limited to, the lithium niobate materials. Definitely, the second modulation module 83 may also be implemented by employing another component.

The polarization state control module 84 is configured to perform polarization state control on the first optical signal, where a polarization state of the first optical signal on which the polarization state control is performed is perpendicular to or consistent with a polarization state of the second optical signal.

The polarization state control module 84 may be implemented by employing an OPC. The polarization state control is performed by setting the work state of the OPC. When the space optical coupling method is used, a half-wave plate is inserted in a space optical channel and an axial position of the half-wave plate is rotated. When an axis direction of the half-wave plate is the same as the optical polarization state, an output polarization state and an input polarization state are the same; when an included angle between the axis direction of the half-wave plate and the optical polarization state is 45 degrees, the output polarization state and the input polarization state are in the perpendicular relationship. When the silicon-based PLC method is used, output polarization state control is implemented by integrating a lithium-niobate-based electrical control cascading wave plate on a silicon substrate and exerting a proper power supply on the wave plate. Definitely, the polarization state control module 84 may also be implemented by employing another component.

The phase shift module 85 is configured to perform a phase shift on the first optical signal or the second optical signal, where a phase difference between the first optical signal and the second optical signal on which the phase shift is performed is $\pi/2$ or remains unchanged.

The phase shift module 85 may be implemented by employing an OPS. When the space optical coupling method is used, a carrier phase of an optical signal is changed by performing a fine adjustment on an optical path of the space optical channel; when the silicon-based PLC method is used, a silicon-based optical waveguide is heated to change a material refractive index of the optical waveguide and thereby change the carrier phase of the optical signal. Definitely, the phase shift module 85 may also be implemented by another component.

The combination module 86 is configured to perform optical signal combination with the polarization state preserved on the first optical signal and the second optical signal after the polarization state control and the phase shift, and output a PDM-BPSK modulation optical signal or a QPSK modulation optical signal.

The combination module 86 may be implemented by employing a PC with a polarization preserving function and a coupling function. When the space optical coupling method is used, two beams of input light are combined into one beam of light through a reflection or penetration manner; when the silicon-based PLC method is used, optical signals are combined by using the silicon-based Y-type waveguide. Definitely, the combination module 86 may also be implemented by employing another component The apparatus for implementing the PDM-BPSK modulation and the QPSK modulation in the compatible manner according to this embodiment of the present invention performs the polarization state control on the first optical signal, performs the phase shift on the first optical signal or the second optical signal, and performs the optical signal combination with the polarization state preserved on the first optical signal and the second optical signal after the polarization state control and the phase shift. In this way, the PDM-BPSK modulation optical signal or the QPSK modulation optical signal may be output based on a relationship between the polarization state of the first optical signal and the polarization state of the second optical signal, and the phase difference between the first optical signal and the second optical signal. Embodiments of the present invention may employ an apparatus to implement the two types of modulation manner PDM-BPSK and QPSK in the compatible manner, which saves a design cost and increases modulation flexibility.

Embodiment 9

Figure 9:
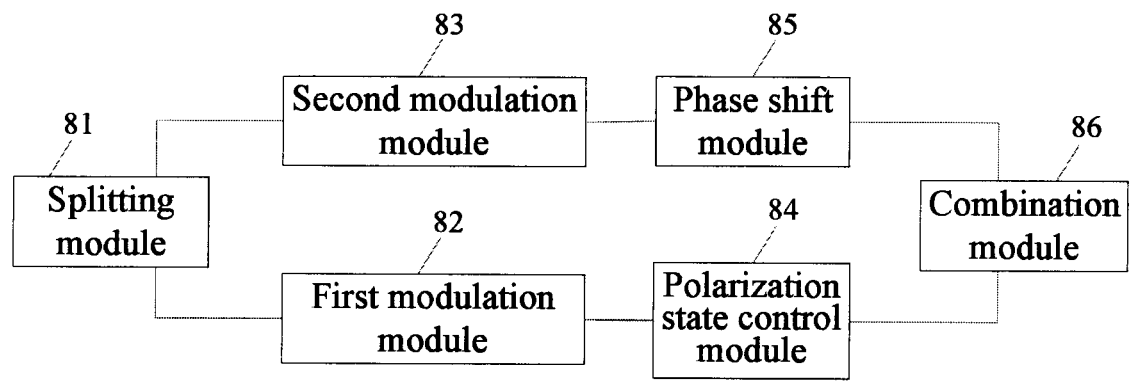
FIG. 9 is a schematic structural diagram of an apparatus according to a ninth embodiment of the present invention.

This embodiment provides an apparatus for implementing PDM-BPSK modulation and QPSK modulation in a compatible manner. As shown in FIG. 9, the apparatus includes:

a splitting module 81, configured to divide a DC light into a first channel of light and a second channel of light with the same power;

a first modulation module 82, configured to perform optoelectrical modulation on the first channel of light and output a first optical signal in a BPSK format;

a second modulation module 83, configured to perform optoelectrical modulation on the second channel of light and output a second optical signal in the BPSK format;

a polarization state control module 84, configured to perform polarization state control on the first optical signal, where a polarization state of the first optical signal on which the polarization state control is performed is perpendicular to or consistent with a polarization state of the second optical signal;

a phase shift module 85, configured to perform a phase shift on the second optical signal, where a phase difference between the second optical signal on which the phase shift is performed and the first optical signal is $\pi/2$ or remains unchanged; and a combination module 86, configured to perform optical signal combination with the polarization state preserved on the first optical signal on which the polarization state control is performed and the second optical signal on which the phase shift is performed, and output a PDM-BPSK modulation optical signal or a QPSK modulation optical signal.

Figure 9A:
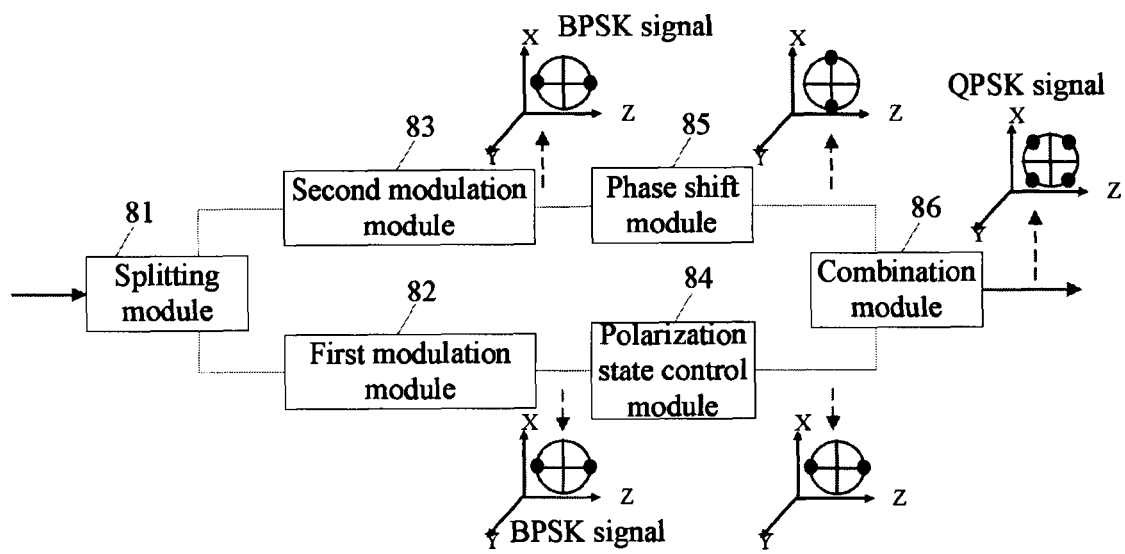
FIG. 9a is a schematic diagram of outputting a QPSK modulation optical signal by using the apparatus according to the ninth embodiment 9 of the present invention.

As shown in FIG. 9a, the polarization state control module 84 is specifically configured to perform the polarization state control on the first optical signal in the BPSK format until the polarization state of the first optical signal and that of the second optical signal are consistent.

The phase shift module 85 is specifically configured to perform the phase shift on the second optical signal in the BPSK format until the phase difference between the first optical signal and the second optical signal is $\pi/2$.

In this case, the combination module 86 performs the optical signal combination with the polarization state preserved on the first optical module that passes through the polarization state control module 84 and the second optical signal that passes through the phase shift module 85, and output the QPSK modulation optical signal.

Figure 9B:
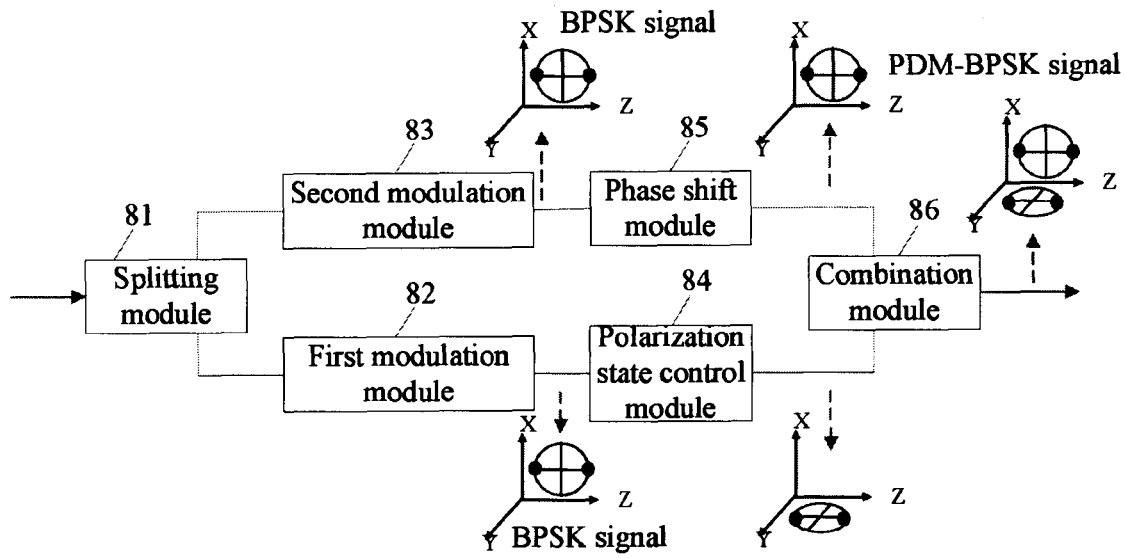
FIG. 9b is a schematic diagram of outputting a PDM-BPSK modulation optical signal by using the apparatus according to the ninth embodiment of the present invention.

As shown in FIG. 9b, the polarization state control module 84 is specifically configured to perform the polarization state control on the first optical signal in the BPSK format until the polarization state of the first optical signal is perpendicular to that of the second optical signal.

The phase shift module 85 is specifically configured to perform the phase shift on the second optical signal in the BPSK format by an arbitrary value. Alternatively, the phase shift module 85 does not perform the phase shift on the second optical signal; that is, the phase difference between the second optical signal on which the phase shift is performed and the first optical signal remains unchanged.

In this case, the combination module 86 performs the optical signal combination with the polarization state preserved on the first optical signal module that passes through the polarization state control module 84 and the second optical signal that passes through the phase shift module 85, and outputs the PDM-BPSK modulation optical signal.

For an implementation manner of each module, refer to each corresponding module in the eighth embodiment.

The apparatus for implementing the PDM-BPSK modulation and the QPSK modulation in the compatible manner according to this embodiment of the present invention performs the polarization state control on the first optical signal, performs the phase shift on the second optical signal, and performs the optical signal combination with the polarization state preserved on the first optical signal on which the polarization state control is performed and the second optical signal on which the phase shift is performed. In this way, the PDM-BPSK modulation optical signal or the QPSK modulation optical signal may be output based on a relationship between the polarization state of the first optical signal and the polarization state of the second optical signal, and the phase difference between the first optical signal and the second optical signal. Embodiments of the present invention may employ an apparatus to implement the two types of modulation manner PDM-BPSK and QPSK in the compatible manner, which saves a design cost and increases modulation flexibility.

Embodiment 10

Figure 10:
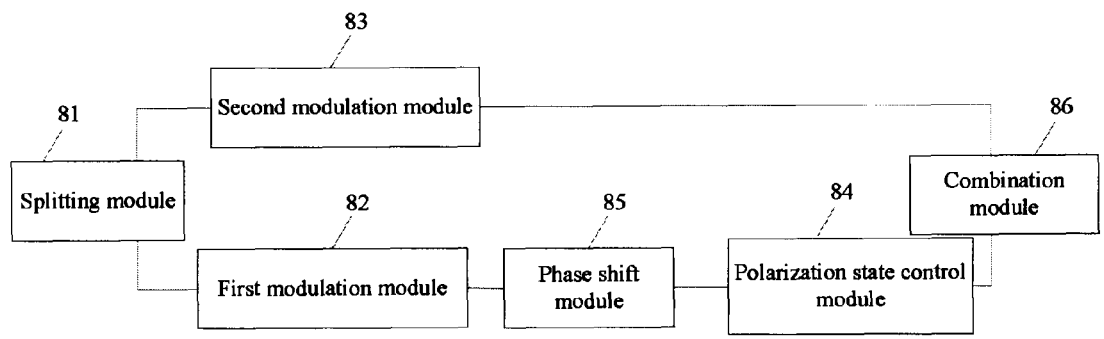
FIG. 10 is a schematic structural diagram of an apparatus according to a tenth embodiment of the present invention.

This embodiment provides an apparatus for implementing PDM-BPSK modulation and QPSK modulation in a compatible manner. As shown in FIG. 10, the apparatus includes:

a splitting module 81, configured to divide a DC light into a first channel of light and a second channel of light with the same power;

a first modulation module 82, configured to perform optoelectrical modulation on the first channel of light and output a first optical signal in a BPSK format;

a second modulation module 83, configured to perform optoelectrical modulation on the second channel of light and output a second optical signal in the BPSK format;

a phase shift module 85, configured to perform a phase shift on the first optical signal, where a phase difference between the first optical signal on which the phase shift is performed and the second optical signal is $\pi/2$ or remains unchanged;

a polarization state control module 84, configured to perform polarization state control on the first optical signal on which the phase shift is performed, where a polarization state of the first optical signal on which the polarization state control is performed is perpendicular to or consistent with a polarization state of the second optical signal; and a combination module 86, configured to perform optical signal combination with the polarization state preserved on the first optical signal on which the polarization state control is performed and the second optical signal, and output a PDM-BPSK modulation optical signal or a QPSK modulation optical signal.

For a specific implementation process of outputting the QPSK modulation optical signal or the PDM-BPSK modulation optical signal by using the apparatus provided in this embodiment, refer to the description in the ninth embodiment, which is not described here.

For an implementation manner of each module, refer to each corresponding module in the eighth embodiment.

The apparatus for implementing the PDM-BPSK modulation and the QPSK modulation in the compatible manner according to this embodiment of the present invention performs the phase shift on the first optical signal, performs the polarization state control on the first optical signal on which the phase shift is performed, and performs the optical signal combination with the polarization state preserved on the first optical signal on which the polarization state control is performed and the second optical signal. In this way, the PDM-BPSK modulation optical signal or the QPSK modulation optical signal may be output based on a relationship between the polarization state of the first optical signal and that of the second optical signal, and the phase difference between the first optical signal and the second optical signal. Embodiments of the present invention may employ an apparatus to implement the two types of modulation manner PDM-BPSK and QPSK in the compatible manner, which saves a design cost and increases modulation flexibility.

Embodiment 11

Figure 11:
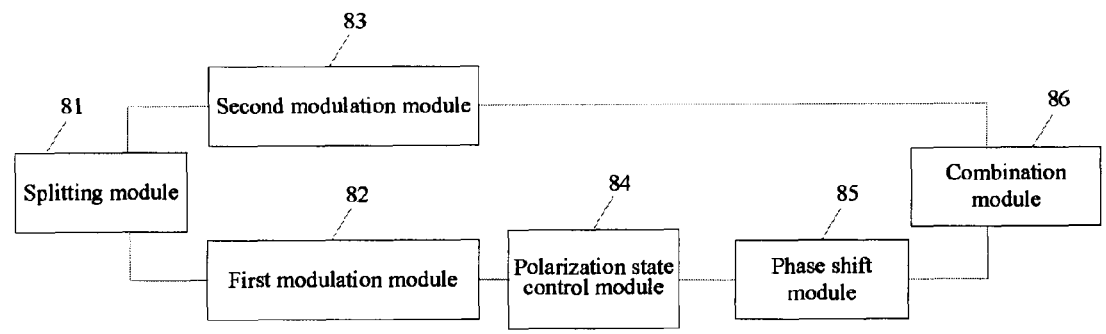
FIG. 11 is a schematic structural diagram of an apparatus according to an eleventh embodiment of the present invention.

This embodiment provides an apparatus for implementing PDM-BPSK modulation and QPSK modulation in a compatible manner. As shown in FIG. 11, the apparatus includes:

a splitting module 81, configured to divide a DC light into a first channel of light and a second channel of light with the same power;

a first modulation module 82, configured to perform optoelectrical modulation on the first channel of light and output a first optical signal in a BPSK format;

a second modulation module 83, configured to perform optoelectrical modulation on the second channel of light and output a second optical signal in the BPSK format;

a polarization state control module 84, configured to perform polarization state control on the first optical signal, where a polarization state of the first optical signal on which the polarization state control is performed is perpendicular to or consistent with a polarization state of the second optical signal;

a phase shift module 85, configured to perform a phase shift on the first optical signal on which the polarization state control is performed, where a phase difference between the first optical signal on which the phase shift is performed and the second optical signal is $\pi/2$ or remains unchanged; and a combination module 86, configured to perform optical signal combination with the polarization state preserved on the first optical signal on which the phase shift is performed and the second optical signal, and output a PDM-BPSK modulation optical signal or a QPSK modulation optical signal.

For a specific implementation process of outputting the QPSK modulation optical signal or the PDM-BPSK modulation optical signal by using the apparatus provided in this embodiment, refer to the description in the ninth embodiment, which is not described here.

For an implementation manner of each module, refer to each corresponding module in the eighth embodiment.

The apparatus for implementing the PDM-BPSK modulation and the QPSK modulation in the compatible manner according to this embodiment of the present invention performs the polarization state control on the first optical signal, performs the phase shift on the first optical signal on which the polarization state control is performed, and performs the optical signal combination with the polarization state preserved on the first optical signal on which the phase shift is performed and the second optical signal. In this way, the PDM-BPSK modulation optical signal or the QPSK modulation mode optical signal may be output based on a relationship between the polarization state of the first optical signal and that of the second optical signal, and the phase difference between the first optical signal and the second optical signal. Embodiments of the present invention may employ an apparatus to implement the two types of modulation manner PDM-BPSK and QPSK in the compatible manner, which saves a design cost and increases modulation flexibility.

The apparatus for implementing the PDM-BPSK modulation and the QPSK modulation in the compatible manner according to this embodiment of the present invention may implement the preceding method embodiments. The method and apparatus for implementing the PDM-BPSK modulation and the QPSK modulation in the compatible manner according to the embodiments of the present invention may be applicable to, but not limited to, the compatible modulation of PDM-BPSK and QPSK.

Persons of ordinary skill in the art should understand that all or part of the processes of the methods provided in the preceding embodiments may be implemented by a program instructing relevant hardware. The program may be stored in a computer readable storage medium. When the program runs, the processes of the methods in each of the preceding embodiments may be performed. The storage medium may be a magnetic disk, a CD-ROM, a read-only memory (Read-Only Memory, ROM), a random access memory (Random Access Memory, RAM), and so on.

The foregoing describes only specific implementation manners of the present invention, but the protection scope of the present invention is not limited to the foregoing. Any modification or replacement readily conceivable for a person skilled in the art in the scope of the technology disclosed herein shall fall within the protection scope of the present invention. Therefore, the protection scope of the present invention is subject to the appended claims.

The invention claimed is:

1. A method for implementing a Polarization Division Multiplexing Binary Phase Shift Keying (PDM-BPSK) modulation and a Quadrature Phase Shift Keying (QPSK) modulation in a compatible manner, comprising:

dividing a direct current (DC) light into a first channel of light and a second channel of light with the same power;

separately performing an optoelectrical modulation on the first channel of light and the second channel of light and correspondingly outputting a first optical signal and a second optical signal in a Binary Phase Shift Keying (BPSK) format;

performing a polarization state control on the first optical signal, wherein a polarization state of the first optical signal on which the polarization state control is performed is perpendicular to or consistent with a polarization state of the second optical signal;

performing a phase shift on the first optical signal or the second optical signal, wherein a phase difference between the first optical signal and the second optical signal after the phase shift is performed on the first optical signal or the second optical signal is $\pi/2$ or remains unchanged; and performing an optical signal combination with the polarization state preserved on the first optical signal and the second optical signal after the polarization state control and the phase shift, and outputting a PDM-BPSK modulation optical signal or a QPSK modulation optical signal.

2. The method according to claim 1, wherein the performing the polarization state control on the first optical signal comprises:

performing the polarization state control on the first optical signal until the polarization state of the first optical signal is perpendicular to that of the second optical signal; and the performing the optical signal combination with the polarization state preserved on the first optical signal and the second optical signal after the polarization state control and the phase shift, and outputting the PDM-BPSK modulation optical signal or the QPSK modulation optical signal comprises:

performing the optical signal combination with the polarization state preserved on the first optical signal and the second optical signal after the polarization state control and the phase shift, and outputting the PDM-BPSK modulation optical signal.

3. The method according to claim 1, wherein the performing the polarization state control on the first optical signal comprises:

performing the polarization state control on the first optical signal until the polarization state of the first optical signal is consistent with that of the second optical signal; and the performing the phase shift on the first optical signal or the second optical signal comprises:

performing the phase shift on the first optical signal or the second optical signal until the phase difference between the first optical signal and the second optical signal is $\pi/2$; and the performing the optical signal combination with the polarization state preserved on the first optical signal and the second optical signal after the polarization state control and the phase shift, and outputting the PDM-BPSK modulation optical signal or the QPSK modulation optical signal comprises:

performing the optical signal combination with the polarization state preserved on the first optical signal and the second optical signal after the polarization state control and the phase shift, and outputting the QPSK modulation optical signal.

4. The method according to claim 1, wherein the optical signal combination with the polarization state preserved is implemented through a space optical coupling method or a planar waveguide coupling method.

5. The method according to claim 2, wherein the optical signal combination with the polarization state preserved is implemented through a space optical coupling method or a planar waveguide coupling method.

6. The method according to claim 3, wherein the optical signal combination with the polarization state preserved is implemented through a space optical coupling method or a planar waveguide coupling method.

7. An apparatus for implementing a Polarization Division Multiplexing Binary Phase Shift Keying (PDM-BPSK) modulation and a Quadrature Phase Shift Keying (QPSK) modulation in a compatible manner, comprising:

a splitting module, configured to divide a direct current (DC) light into a first channel of light and a second channel of light with the same power;

a first modulation module, configured to perform an optoelectrical modulation on the first channel of light and output a first optical signal in a Binary Phase Shift Keying (BPSK) format;

a second modulation module, configured to perform an optoelectrical modulation on the second channel of light and output a second optical signal in the BPSK format;

a polarization state control module, configured to perform a polarization state control on the first optical signal, wherein a polarization state of the first optical signal on which the polarization state control is performed is perpendicular to or consistent with a polarization state of the second optical signal;

a phase shift module, configured to perform a phase shift on the first optical signal or the second optical signal, wherein a phase difference between the first optical signal and the second optical signal on which the phase shift is performed is $\pi/2$ or remains unchanged; and a combination module, configured to perform an optical signal combination with the polarization state preserved on the first optical signal and the second optical signal after the polarization state control and the phase shift, and outputting a PDM-BPSK modulation optical signal or a QPSK modulation optical signal.

8. The apparatus according to claim 7, wherein the phase shift module is configured to perform the phase shift on the second optical signal; and the combination module is configured to perform the optical signal combination with the polarization state preserved on the first optical signal on which the polarization state control is performed and the second optical signal on which the phase shift is performed, and output the PDM-BPSK modulation optical signal or the QPSK modulation optical signal.

9. The apparatus according to claim 7, wherein the phase shift module is configured to perform the phase shift on the first optical signal;

the polarization state control module is configured to perform the polarization state control on the first optical signal on which the phase shift is performed; and the combination module is configured to perform the optical signal combination with the polarization state preserved on the first optical signal on which the polarization state control is performed and the second optical signal, and output the PDM-BPSK modulation optical signal or the QPSK modulation optical signal.

10. The apparatus according to claim 7, wherein the phase shift module is configured to perform the phase shift on the first optical signal on which the polarization state control is performed; and the combination module is configured to perform the optical signal combination with the polarization state preserved on the first optical signal on which the phase shift is performed and the second optical signal, and output the PDM-BPSK modulation optical signal or the QPSK modulation optical signal.

11. The apparatus according to claim 7, wherein the polarization state control module is configured to perform the polarization state control on the first optical signal until the polarization state of the first optical signal and that of the second optical signal are consistent; and the phase shift module is configured to perform the phase shift on the first optical signal or the second optical signal until the phase difference between the first optical signal and the second optical signal is $\pi/2$.

12. The apparatus according to claim 7, wherein the polarization state control module is configured to perform the polarization state control on the first optical signal until the polarization state of the first optical signal is perpendicular to that of the second optical signal.

13. The apparatus according to claim 7, wherein the splitter module, the polarization state control module, the phase shift module, and the combination module are implemented by using a space optical coupling method or a planar optical waveguide method.

14. The apparatus according to claim 8, wherein the splitter module, the polarization state control module, the phase shift module, and the combination module are implemented by using a space optical coupling method or a planar optical waveguide method.

15. The apparatus according to claim 9, wherein the splitter module, the polarization state control module, the phase shift module, and the combination module are implemented by using a space optical coupling method or a planar optical waveguide method.

16. The apparatus according to claim 10, wherein the splitter module, the polarization state control module, the phase shift module, and the combination module are implemented by using a space optical coupling method or a planar optical waveguide method.

* * * * *